United States Patent [19]

Enein

[11] Patent Number: 4,623,892

[45] Date of Patent: Nov. 18, 1986

[54] DYNAMIC LIMITER FOR MLS RECEIVER

[75] Inventor: Mohamed Enein, Northport, N.Y.

[73] Assignee: Hazeltine Corporation, Commack, N.Y.

[21] Appl. No.: 685,861

[22] Filed: Dec. 24, 1984

[51] Int. Cl.$^4$ .............................. G01S 1/16; G01S 1/18
[52] U.S. Cl. ..................................... 342/411; 364/429
[58] Field of Search ............... 343/408, 410, 411, 413; 364/427, 428, 429, 430

[56] References Cited

U.S. PATENT DOCUMENTS

| | | | |
|---|---|---|---|
| 3,279,724 | 10/1966 | Miller | 364/430 |
| 3,521,229 | 7/1970 | Lepers et al. | 343/411 |
| 3,624,366 | 11/1971 | Angus | 364/430 |
| 3,944,171 | 3/1976 | Boone et al. | 364/429 |
| 3,946,358 | 3/1976 | Bateman | 364/429 |
| 4,164,340 | 8/1979 | Simpson | 364/429 |
| 4,357,661 | 11/1982 | Lambregts et al. | 364/430 |
| 4,499,586 | 2/1985 | Cafarella et al. | 343/411 |

Primary Examiner—Theodore M. Blum
Assistant Examiner—David Cain
Attorney, Agent, or Firm—E. A. Onders; F. R. Agovino

[57] ABSTRACT

Received scanning signals radiated by a MLS ground system are used to determine and evaluate the approach angle of the aircraft. The difference between the angle for a particular scanning signal and the angle for a previous scanning signal is compared to a predetermined difference. A flag or alarm is indicated when the difference is greater than the predetermined difference for one second.

4 Claims, 3 Drawing Figures

DYNAMIC LIMITER FOR MLS RECEIVER

BACKGROUND OF THE INVENTION

1. Field of the Invention

The invention generally relates to receivers for receiving scanning signals and, in particular, to a microwave landing system (MLS) receiver for receiving scanning signals provided by an MLS ground system.

2. Description of the Prior Art

The International Civil Aviation Organization (ICAO) has adopted a time reference scanning beam (TRSB) technique as the standard for microwave landing systems. MLS ground systems provide elevation (EL) and azimuth (AZ) scanning beams, each including a TO scan followed by a FRO scan, defining the area of coverage of the ground system. An MLS receiver located in an aircraft receives the EL scan and AZ scan and is able to determine the azimuth and elevation locations of the aircraft with respect to the ground system. As part of its function, an MLS receiver monitors certain performance parameters as compared to the dynamic limits of the aircraft. Specifically, an MLS receiver indicates a flag when the rate of change of the azimuth or elevation angles surpasses a predetermined dynamic limit for the aircraft.

SUMMARY OF THE INVENTION

It is an object of this invention to provide an MLS receiver which evaluates the rate of change of the elevation and azimuth angles of an aircraft.

The apparatus according to the invention is an improvement in microwave landing system (MLS) receivers for use in an aircraft. Such receivers include means for receiving scanning signals radiated by an MLS ground system and means for determining the angle between the aircraft and the scanning signals. The improvement according to the invention comprises first means for determining the difference between the angle for a particular scanning signal and the angle for a previous scanning signal. Second means compares the difference to a predetermined difference and third means, responsive to the second means, provides an alarm when the difference is greater than the predetermined difference.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
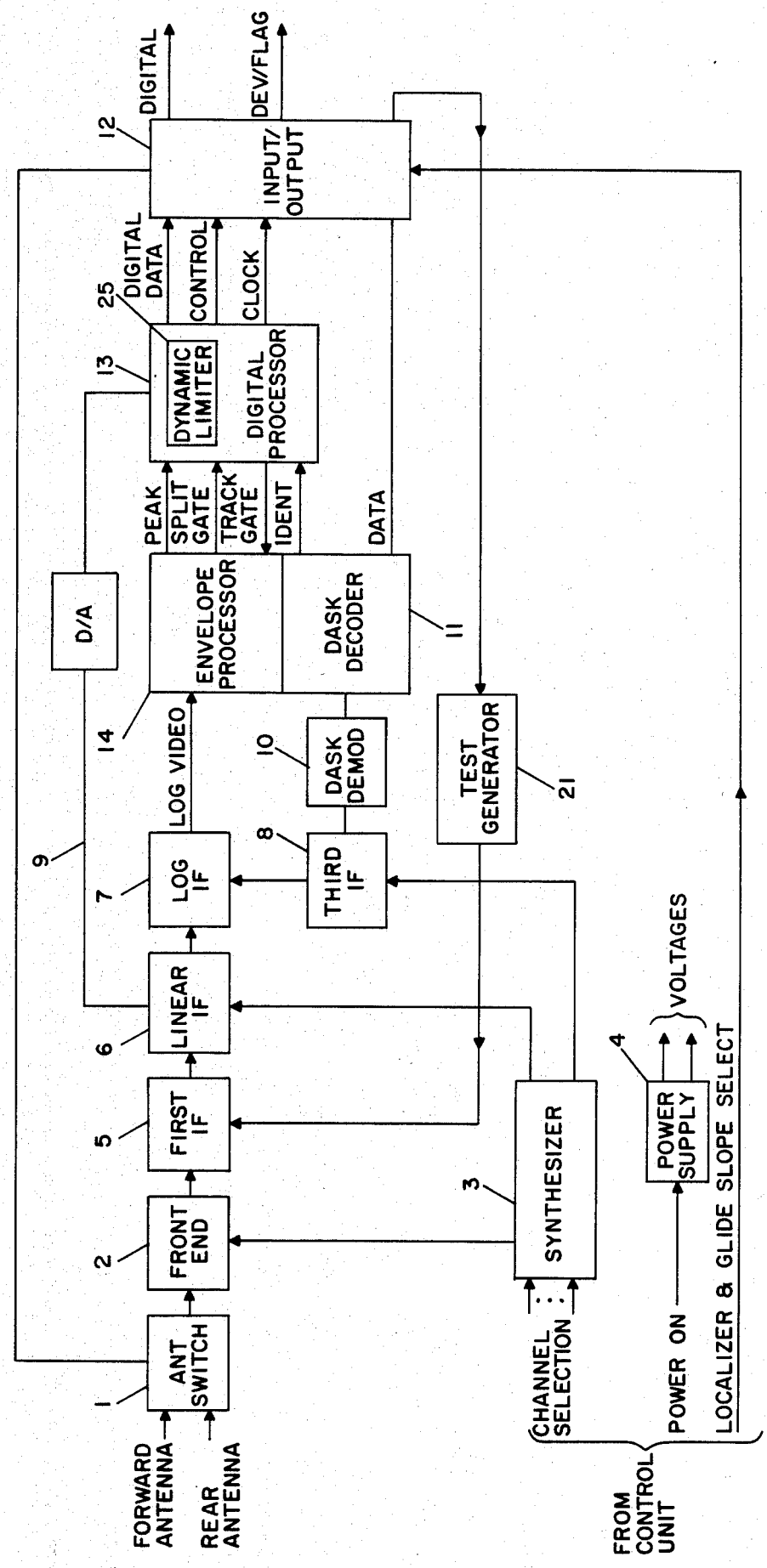
FIG. 1 is a block diagram of a microwave landing system receiver.

As illustrated in FIG. 1, the MLS receiver is provided with an antenna switch 1 which connects either the forward antenna or the rear antenna to front end 2. A control unit (not shown) provides channel selection information to frequency synthesizer 3 which, in turn, provides the appropriate frequency to front end 2 for down conversion of the received signal to an intermediate frequency. The control unit also provides power "on" information to power supply 4 which supplies voltages to the various components of the receiver.

MLS receivers require an intermediate frequency (IF) amplifier having a dynamic range which exceeds 80dB. In order to achieve such a dynamic range, the receiver according to FIG. 1 includes an IF amplifier chain including a first IF amplifier 5 followed by a second IF amplifier consisting of linear IF amplifier 6 and logarithmic IF amplifier 7. The chain is followed by a third IF amplifier 8. Linear IF amplifier 6 and third IF amplifier 8 are provided with appropriate frequencies by synthesizer 3 depending on the channel selection. This chain of amplifiers is designed with a linear-logarithmic response so that the logarithmic IF amplifier properties may be used without the difficulties attendant to an amplifier with a particular characteristic over the entire range.

For small signals, linear amplifiers 5 and 6 provide sufficient gain for the logarithmic IF amplifier 7 to operate within its range. As the signal level increases beyond an established level on an overall response curve of logarithmic IF amplifier 7, an AGC voltage is applied to linear IF amplifier 6 via line 9 to decrease the total gain of the linear amplifier so that logarithmic IF amplifier 7 is operating within its range. Similarly, if the signal level provided by linear IF amplifier 6 decreases below an established level on the overall response curve of logarithmic IF amplifier 7, an AGC voltage is applied to amplifier 6 so as to increase the gain. The result is that the first and linear IF amplifiers 5 and 6 maintain operation within the logarithmic response of the receiver characteristic as defined by logarithmic IF amplifier 7.

According to the ICAO standard, the scanning signals provided to the receiver are encoded with differential phase shift keying (DPSK) data. The output of third IF amplifier 8 is provided to DPSK demodulator 10 which is followed by DPSK decoder 11 for demodulating and decoding the data provided to input/output 12. Localizer and glide slope select information from the control unit along with the decoded data are provided to the input/output 12 which controls antenna switch 1 and the deviation or "flag" indicators of the receiver. Input/output 12 also provides digital information to the control unit and provides control information to digital processor 13.

Figure 2:
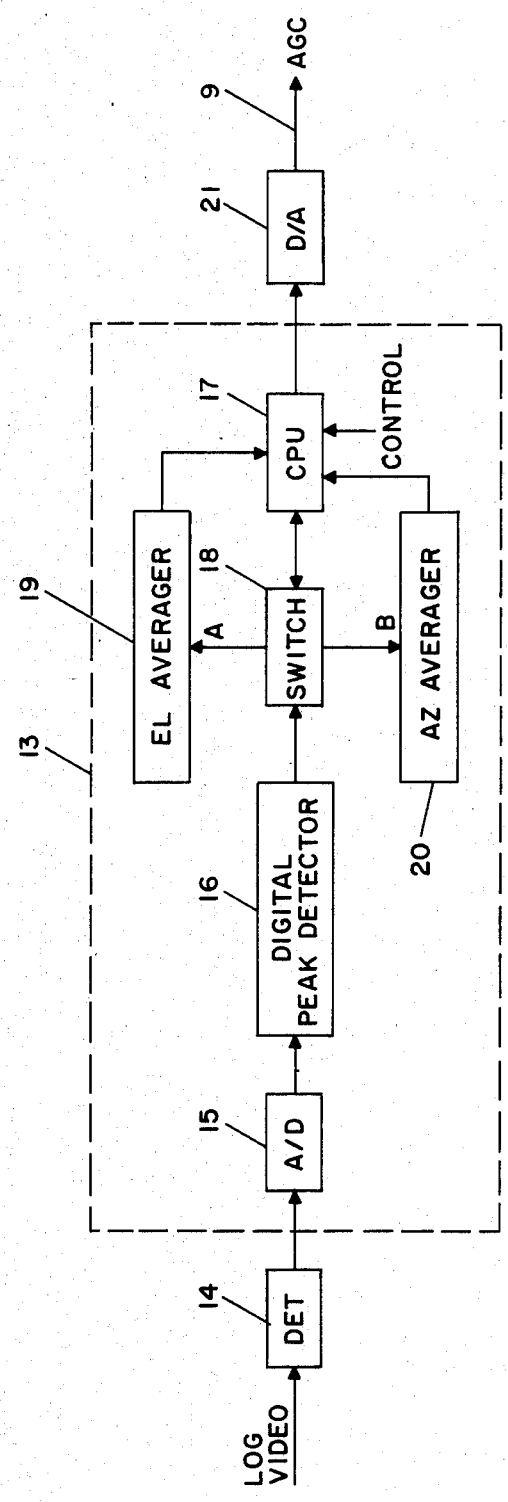
FIG. 2 is a block diagram of a microprocessor controlled automatic gain control for a receiver such as the MLS receiver illustrated in FIG. 1.

Logarithmic video information provided by logarithmic IF amplifier 7 is also provided to envelope processor 14. Since the receiver operates in a time division multiplexed mode in which the relative amplitudes of successive azimuth and elevation signals of interest may vary greatly, the amplitude levels of the azimuth and elevation functions are stored for use in controlling the gain of linear IF amplifier 6. This allows the appropriate AGC voltage to be applied via line 9 prior to the anticipated detection of each angle function. Digital microprocessor 13 accomplishes this control. FIG. 2 illustrates in detail the portions in digital processor 13 which achieve this result.

In particular, as shown in FIG. 2, the logarithmic video information provided by logarithmic amplifier 7 is provided to envelope detector (processor) 14. The resulting detected signal is digitized by analog-to-digital converter 15 and this digitized information is provided to digital peak detector 16. Central processing unit 17 of digital microprocessor 13 controls switch 18 based on control information provided by input/output 12. During each "EL" scan period, switch 18 is in the A position so that the digital peak information detected by detector 16 is provided to EL averager 19. During the "AZ" scan period, CPU 17 places switch 18 in the B position so that the digital peak information for the received AZ scan period as detected by detector 16, is provided to AZ averager 20. The average peak amplitude of the elevation and azimuth scans is provided to CPU 17 which, in turn, determines the AGC voltage necessary to maintain operation of logarithmic amplifier 7 within the range of its logarithmic characteristic. CPU 17 provides a digital signal representing the required AGC voltage to digital-to-analog converter 21 which converts the digital signal into an analog AGC voltage for application to the control input of linear IF amplifier 6.

The receiver may also be provided with a test generator 21, as shown in FIG. 1, which is operated by input/output 12 in response to a test request from the control unit. Test generator 21 provides predetermined IF signals to the first IF amplifier 5 for initiating the test. Digital microprocessor 13 also provides digital data and clock information to input/output 12 and track gate information to envelope processor 14. Envelope processor 14 also provides split gate information to digital processor 13, and DPSK decoder 11 provides identification information to digital processor 13.

The required AGC level is determined by noting the peak amplitude of the signal during each sweep of each angle function. The past several peaks of each beam, i.e. azimuth or elevation, are averaged after the beam has been digitized. The appropriate AGC voltage is then selected and applied via line 9 to second IF amplifier 6. In the acquisition phase, when the signal level may be expected to deviate considerably from the desired level, the AGC correction is made gradually over several beam sweeps. When no signal is being received, the IF gain of amplifier 6 is at a maximum. It remains at a maximum as a beam is sensed until the identification modulation has been decoded by decoder 11. At that time, the appropriate AGC voltage is applied to linear IF amplifier 9 so that the amplifier gain has been established prior to the commencement of the angle scan.

The receiver may also be provided with a test generator 21 which is operated by input/output 12 in response to a test request from the control unit. Test generator 21 provides IF signals to the first IF amplifier 5 for generating the test. Digital microprocessor 13 also provides digital data and clock information to input/output 12 and track gate information to envelope processor 14. Envelope processor 14 also provides split gate information to digital processor 13 and DPSK decoder provides identification information to digital processor 13.

Figure 3:
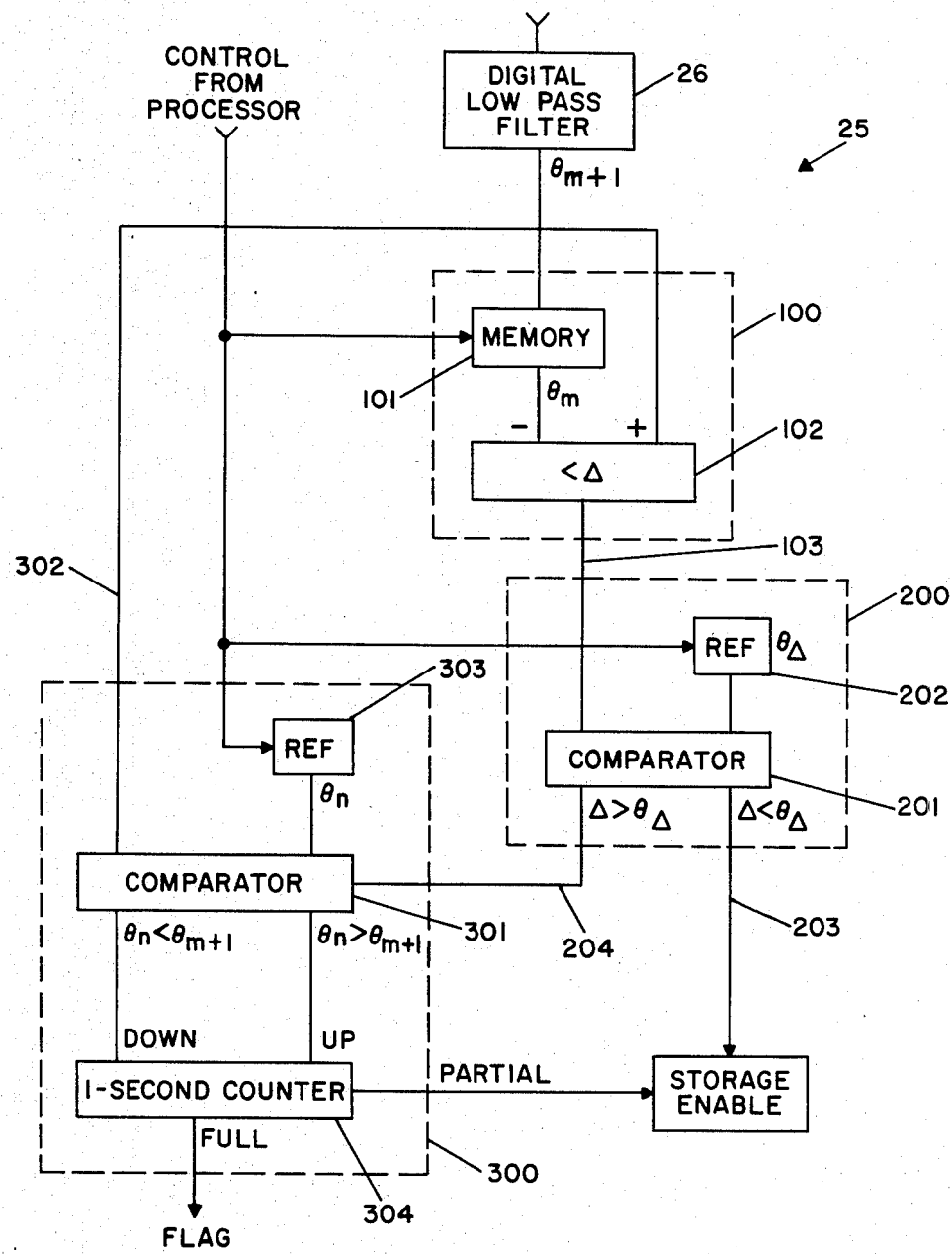
FIG. 3 is a functional block diagram of a dynamic limiter according to the invention.

Dynamic limiter 25 according to the invention is part of digital processor 13. By evaluating the time lapse between the TO scan and the FRO scan, digital processor 13 is able to determine the azimuth and the elevation angles of the aircraft with respect to the MLS ground system. This information, in the form of digital data, is provided to dynamic limiter 25, a preferred embodiment of which is illustrated in FIG. 3. Specifically, the digital data is processed through low pass filter 26 and provided to first means 100 for determining the difference between the angle of a particular scanning signal as compared to the angle of a previous scanning signal. Means 100 includes memory 101 for storing the digital data specifying the elevation and azimuth angles of the aircraft with respect to the ground system. The digital data is also provided to subtractor 102. Control information from processor 13 is provided to memory 101 in the form of address information so that memory 101 provides subtractor 102 with the previous scan angle which is to be subtracted from the present scan angle. The difference between these scan angles is provided via line 103 to means 200 for comparing the difference to a predetermined difference.

Line 103 supplies the difference information to comparator 201 which compares the difference to a reference difference provided by memory 202 in response to control information from processor 13. If the difference is less than the reference difference, comparator 201 provides a storage enable signal via line 203. However, if the difference is greater than the reference difference, comparator 201 provides an actuation signal via line 204 to third means 300 for providing an alarm. Comparator 301 receives the angle information via line 302 and compares it to a reference angle provided by memory 303 in response to a control signal from processor 13. If the angle is greater than the reference angle counter 304 is incremented and if the angle is less than the reference angle counter 304 is decremented. Counter 304 is a one second counter and, when full, provides a flag indicating that the rate of change of the angle has exceeded the assigned dynamic limit for the aircraft.

OPERATION OF THE INVENTION

An example of the operation of the dynamic limiter according to the invention is as follows. Assume that during the first elevation scan from a ground station an aircraft is approaching at a 45° elevation angle and a 40° azimuth angle. During the elevation scan by the ground system, the receiver determines the elevation angle to be 45° and stores this information in memory 101. Since this is the first elevation scan, the control from processor 13 does not address memory 101 so that subtractor 102 shows no difference. During the first azimuth scan by the ground system, the receiver determines the azimuth angle to be 40° and stores this information in memory 101. Since this is also the first azimuth angle received by the receiver, dynamic limiter 25 is not actuated.

Assume during the next elevation scan that the angle is determined by the receiver to be 44.9°. This value is stored in memory 101 and provided to the plus side of subtractor 102. The control signal from processor 13 addresses memory 101 to store the next elevation scan value of 44.9° therein and also addresses memory 101 to provide the previous value of 45° to the negative side of subtractor 102. As a result, subtractor 102 determines the difference in elevation angles between successive scans to be 0.1°. This difference is compared by comparator 201 to the reference difference stored in memory 202. Assuming the reference difference to be 0.2°, the actual difference is less than the reference difference so that comparator 2 provides a storage enable signal along line 203. Preferably, subtractor 102 will determine the difference between sucsessive scans of the elevation beam. However, memory 101 may store any number of successive scans and can be addressed by processor 13 to provide any previous scan angle to subtractor 102 for subtraction from the present scan angle.

Assume that the next azimuth scan enables the receiver to determine that the azimuth angle of the aircraft is 40.3°. This data is stored in memory 101 and memory 101 provides the previous azimuth angle of 40° to the negative side of subtractor 102 for differentiation with the existing azimuth angle of 40.3° provided to the positive side of subtractor 102. As a result, subtractor 102 determines the difference to be 0.3° and comparator 201 determines that the difference is greater than the referenced difference of 0.2° thereby actuating comparator 301 via line 204.

A control signal from processor 13 addresses memory 303 to provide the reference azimuth angle which is assumed to be 40.0°. This reference angle is compared to the actual azimuth angle of 40.3° by comparator 301 which determines that the actual angle is greater than the reference angle so that counter 304 is decremented. Counter 304 is generally a one second counter based on the scan rate of the ground system. If the ground system is scanning four elevation and four azimuth beams per second, counter 301 would be a 8 bit counter.

Assume that during the next elevation scan the receiver determines the elevation angle to be 44.6°. This value is stored in memory 101 and subtracted from the previous elevation angle of 44.9° by subtractor 102. The difference of 0.3° is compared with the reference difference of 0.2° by comparator 201 which actuates comparator 204 because the difference is greater than the referenced difference. A control signal from processor 13 addresses memory 303 to provide comparator 301 with the reference azimuth angle which is assumed to be 45°. Since the actual elevation angle of 44.6° is less than the reference elevation angle of 45.°, counter 304 is incremented. Assuming the counter is an 8 bit counter and is partially full, a storage enable signal is provided.

As long as the difference between successive elevation angles and successive azimuth angles is within the reference difference stored in memory 202, a storage enable signal will be provided by comparator 201 via line 203. If the difference continues to be greater than the reference difference and either the azimuth or elevation angle is consistently greater than or consistently less than the corresponding reference angle stored in memory 303, counter 304 will continue to be incremented or decremented, respectively, eventually filling and providing a flag signal. If the difference is greater than the reference difference but the azimuth and elevation angles vary above and below the reference elevation and azimuth angles, counter 304 will be incremented and decremented maintaining a partially full condition and providing a storage enable signal.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a microwave landing system (MLS) receiver for use in an aircraft, said receiver including means for receiving scanning signals radiated by an MLS ground system and means for determining the angle between the aircraft and the scanning signals, the improvement comprising:
    (a) first means for determining the difference between the angle for a particular scanning signal as compared to the angle for a previous scanning signal;
    (b) second means for comparing the difference to a predetermined difference; and
    (c) third means responsive to said second means for providing an alarm when the difference is greater than the predetermined difference.

2. The receiver of claim 1 wherein said third means comprises:
    (a) a counter providing an alarm when full; and
    (b) fourth means responsive to said second means for comparing the angle of the particular scanning signal to a predetermined angle, said fourth means for incrementing said counter when the angle is less than the predetermined angle and for decrementing said counter when the angle is greater than the predetermined angle.

3. The receiver of claim 2 wherein said second means comprises:
    (a) a comparator;
    (b) means for providing the difference to the comparator; and
    (c) means for providing a predetermined elevation difference during elevation scanning signals and a predetermined azimuth difference during azimuth scanning signals to the comparator.

4. The receiver of claim 3 wherein said first means comprises means for storing the previous elevation and azimuth angles and a subtractor for determining the difference between the stored elevation angle to the succeeding elevation angle and the stored azimuth angle to the succeeding azimuth angle.

* * * * *